United States Patent [19]
Ikoma

[11] Patent Number: 5,965,849
[45] Date of Patent: Oct. 12, 1999

[54] STRUCTURE FOR MOUNTING A SENSING ELEMENT FOR MEASURING A LOAD OF A VEHICLE

[75] Inventor: Toshihiko Ikoma, Shizuoka, Japan

[73] Assignee: Yazaki Corporation, Tokyo, Japan

[21] Appl. No.: 08/979,544

[22] Filed: Nov. 26, 1997

[30] Foreign Application Priority Data

Nov. 27, 1996 [JP] Japan ..................................... 8-316219

[51] Int. Cl.$^6$ .................................................. G01G 19/12
[52] U.S. Cl. ............................................. 177/136; 73/841
[58] Field of Search ..................................... 177/136, 137, 177/210 R, DIG. 9; 73/774, 768, 815, 841, 855

[56] References Cited

U.S. PATENT DOCUMENTS

| | | | |
|---|---|---|---|
| 4,478,091 | 10/1984 | Forrester | 177/136 |
| 4,576,053 | 3/1986 | Hatamura | 73/862.66 |
| 5,456,119 | 10/1995 | Nakazaki et al. | 73/841 |
| 5,681,998 | 10/1997 | Nakazaki et al. | 73/774 |
| 5,684,254 | 11/1997 | Nakazaki et al. | 73/774 |

FOREIGN PATENT DOCUMENTS

| | | | |
|---|---|---|---|
| 4407 066 | 9/1994 | Germany . | |
| 66814 | 1/1994 | Japan | H04N 9/093 |
| 8313332 | 11/1996 | Japan | G01G 19/12 |
| 2068562 | 8/1981 | United Kingdom | G01I 1/22 |

*Primary Examiner*—Randy W. Gibson
*Attorney, Agent, or Firm*—Sughrue, Mion, Zinn, Macpeak & Seas, PLLC

[57] ABSTRACT

First and second case assemblies with their respective sensing elements stored into and fixed to the interior portions thereof are respectively stored into the first and second middle diameter portions of a shackle pin which not only are respectively located nearer to the two ends of a through hole so formed as to extend from the one end of the shackle pin to the other end thereof but also are respectively so formed as to correspond in shape to the first and second case assemblies. In the outer peripheral portions of the shackle pin which respectively correspond to the first and second middle diameter portions, in more particular, in the portions thereof shifted in phase by 180° in the peripheral direction of the shackle pin, there are formed long grooves which respectively extend in the axial direction of the shackle pin. A laser beam is radiated onto the long grooves to thereby fix the inner peripheral surfaces of the first and second middle diameter portions to the inner peripheral surfaces of the first and second case assemblies by laser spot welding.

4 Claims, 8 Drawing Sheets

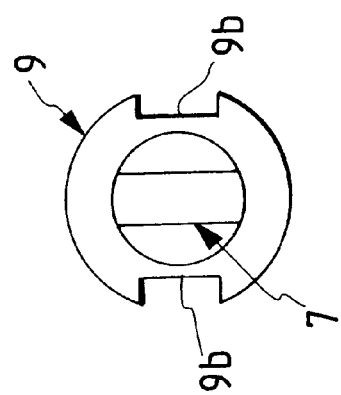
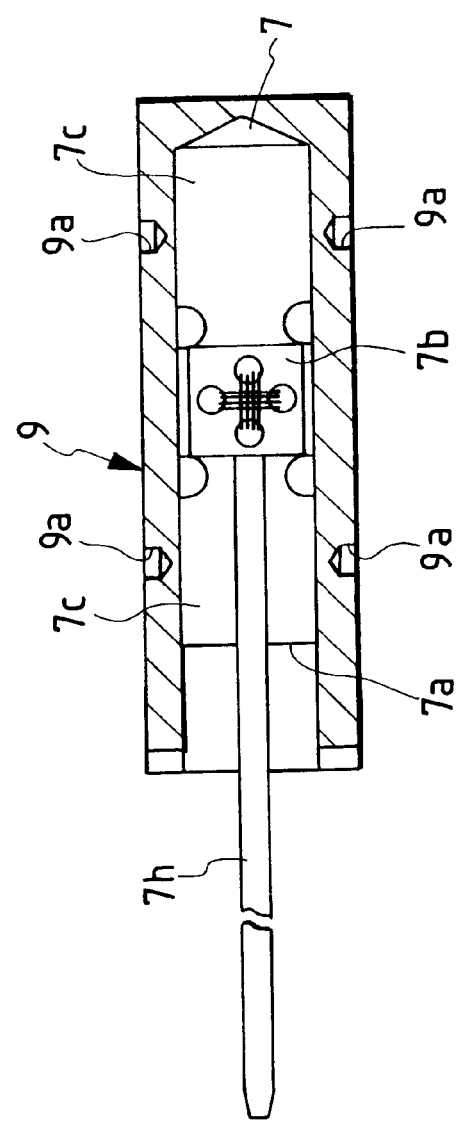

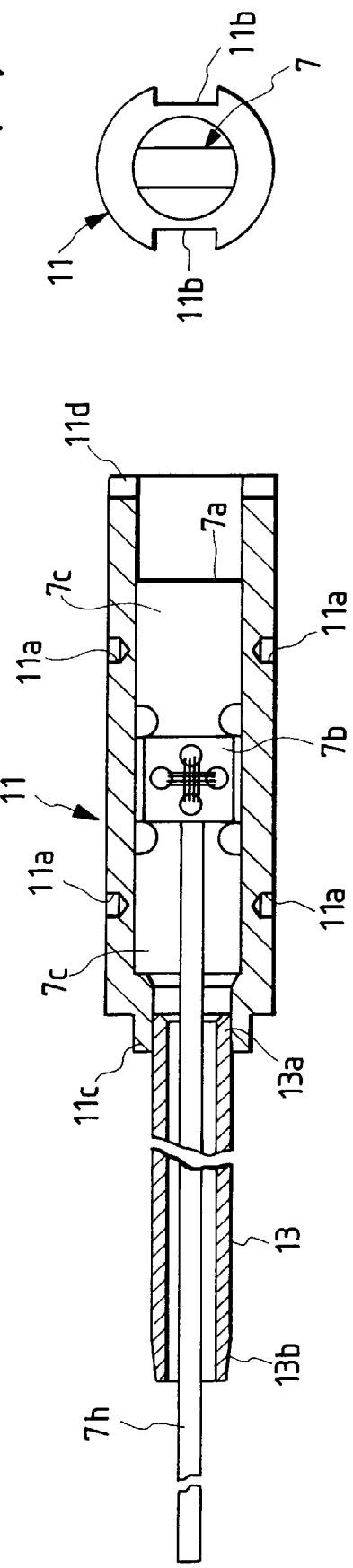

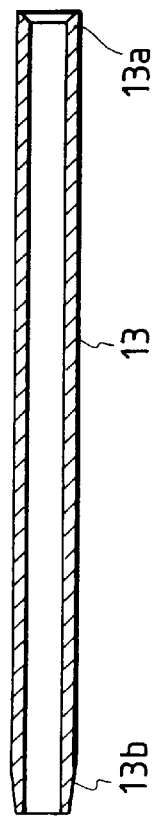
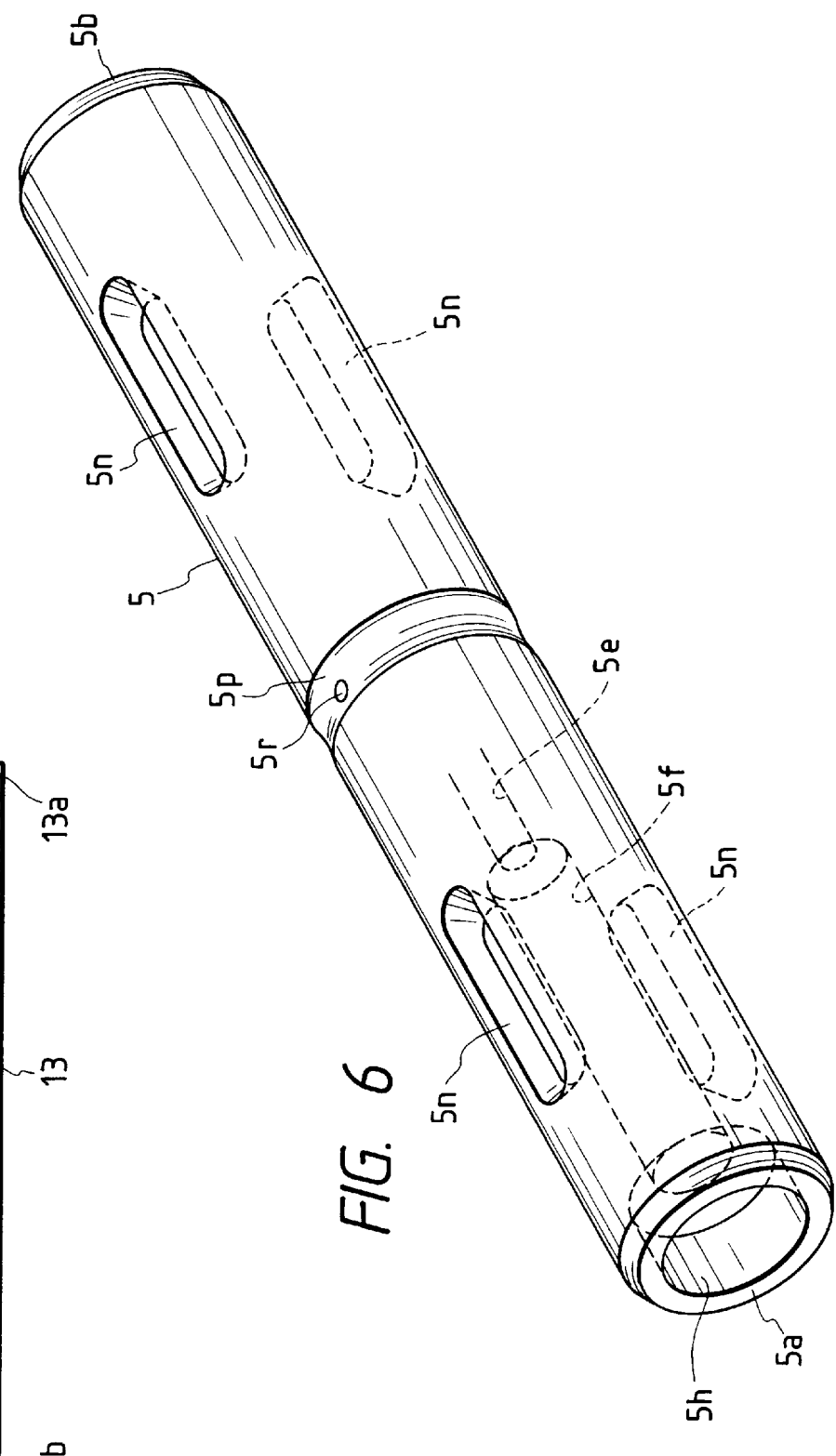
FIG. 5
FIG. 6

STRUCTURE FOR MOUNTING A SENSING ELEMENT FOR MEASURING A LOAD OF A VEHICLE

BACKGROUND OF THE INVENTION

The present invention relates to a structure for mounting a sensing element of a strain gauge type or the like which is provided in a vehicle such as a truck or the like to measure the load put on the vehicle.

Measurement of the load of the vehicle is made mainly for a large-sized vehicle such as a truck or the like not only in order to prevent the large-sized vehicle from causing a traffic accident such as a rollover or the like due to an overweight load, but also in order to prevent the promotion of deterioration of the vehicle and road surface.

Conventionally, the measurement of the vehicle load is made by putting the vehicle to be measured on a platform scale which is commonly referred to as "Kan-kan". However, such conventional measurement must be made in large-scale measuring facilities and requires a wide installation space. Thus, not only the number of platform scales that can be installed is limited, which makes it impossible to measure the loads of many vehicles, but also the installation cost of the platform scales increases.

In view of this, in recent years, there has been provided a load measuring device which is carried in the vehicle itself to measure the load.

In the conventional load measuring device of a vehicle onboard type, for example, in Japanese Patent Unexamined Publication No. Hei. 6-6814 which has been previously proposed by the present assignee, in the end portion of a shackle pin, there is formed a tapered hole which extends along the axial direction of the shackle pin, a sensing element including integrally therewith a tapered fixed member corresponding to the tapered hole of the shackle pin is press inserted into the tapered hole of the shackle pin and the fixed member is made to operate as a wedge, so that the sensing element can be fixed within the shackle pin.

By the way, before the fixing structure disclosed in the above-mentioned publication, there had been known a first fixing structure in which, in the end portion of a shackle pin, there is formed a hole, a through hole in communication with this hole is also formed in the shackle pin in such a manner that it starts from the outer periphery of the shackle pin and extends through the same, and, after a sensing element is stored into the shackle pin, adhesives are put into the interior portion of the hole from the through hole; and, there had also been known a second fixing structure in which, by applying a laser beam to the interior portion of a hole formed in a shackle pin, a sensing element is welded to the inner peripheral surface of the hole of the shackle pin. The sensing element fixing structure disclosed in the above publication is advantageous not only over the first fixing structure in that it is greater in the fixing strength than the first fixing structure, but also over the second fixing structure in that there is eliminated the need to carry out a troublesome operation requiring a high precision that the optical axis of the laser beam is finely matched to the through hole.

After then, in the above-mentioned fixing structure disclosed in the above-mentioned publication, not only in order to eliminate the possibility that, due to the degree of the force used when the sensing element is press inserted into the shackle pin, other forces than the actual load can be applied to the sensing element to make it impossible to obtain an exact output corresponding to the actual load, thereby being able to improve the precision of the load measurement, but also in order to avoid an increase in the manufacturing cost caused by the complicated shapes of the hole formed in the shackle pin and the fixed member portion of the sensing element, in Japanese Patent Application No. Hei. 7-124860, the present assignee has proposed the following improved sensing element mounting structure.

That is, in the improved proposal, there is employed a structure in which the sensing element is stored into and fixed to a case once, and the sensing element is then stored into the shackle pin together with the case. In particular, in such storage, the interior portion of the case is formed to the shape of the sensing element, the exterior portion of the case is formed to the shape of the hole of the shackle pin, and the case is press inserted into the shackle pin in a normal manner which does not use the above-mentioned wedge action, so that the case and sensing element can be fixed to the shackle pin.

According to the above-mentioned improved proposal, since the sensing element can be fixed to the shackle pin without using the wedge action, there is eliminated the trouble to pay attention to the degree of the force when the sensing element is press inserted into the shackle pin and, at the same time, the shapes of the hole of the shackle pin and the sensing element can be simplified to thereby be able to reduce the working costs thereof.

However, at any rate, in the fixing structure in which the case is press inserted into the shackle pin, a dimensional difference between the hole of the shackle pin and the outer shape of the case must be reduced in order to increase a friction force acting between the case and shackle pin. For this reason, not only tolerances between the inside diameter of the shackle pin and the outer shape of the case but also the roughness of the inner peripheral surface of the hole of the shackle pin and the outer peripheral surface of the case require precision, which makes it impossible to reduce the working costs thereof to a sufficient degree. That is, in the fixing structure, there is still left room to be improved.

SUMMARY OF THE INVENTION

The present invention has been made to eliminate the drawbacks found in the above-mentioned conventional sensing element mounting structures. Accordingly, it is an object of the invention to provide, for use in a load measuring unit used to measure the load of a vehicle by use of a sensing element mounted into the interior portion of a shaft member to which the load of the vehicle is applied, a structure for mounting a sensing element for measuring the load of a vehicle which not only can prevent other forces than the actual load of the vehicle from being applied to the sensing element when the sensing element is mounted and an increase in the working cost thereof, but also can obtain a detection value which corresponds to the actual vehicle load, from the sensing element.

In attaining the above object, according to a first aspect of the invention, there is provided a mounting structure for mounting a sensing element for measuring the load of a vehicle into a shaft member to which the vehicle load is applied, which comprises: a storing recessed portion formed in the end portion of the shaft member and extending along the axial direction of the shaft member; a fixing recessed portion formed in the outer peripheral surface of the portion of the shaft member in which the storing recessed portion of the shaft member is formed; and case means to which the sensing element is to be fixed and also which is to be stored into the storing recessed portion, while the shaft member portion in which the fixing recessed portion of the shaft member is formed is fixed by welding to the case means which is stored in the storing recessed portion.

Also, according to a second aspect of the invention, there is provided a mounting structure for mounting a sensing element for measuring the load of a vehicle, the storing recessed portion and the fixing recessed portion are respectively formed in the two end portions of the shaft member, and the portions of the two ends of the shaft member in which the fixing recessed portions are formed are respectively welded to the case means stored in the respective storing recessed portions formed in the two end portions of the shaft member.

Further, according to a third aspect of the invention, there is provided a mounting structure for mounting a sensing element for measuring the load of a vehicle, in which the fixing recessed portion of the shaft member fixed by welding to the case means is filled up with fillers.

Further, according to a fourth aspect of the invention, there is provided a mounting structure for mounting a sensing element for measuring the load of a vehicle, in which a plurality of fixing recessed portions of the above-mentioned type are formed at intervals in the peripheral direction of the shaft member in the outer peripheral surfaces of the shaft member portions in which the storing recessed portions of the shaft member are formed, and the shaft member portions in which the plurality of fixing recessed portions are formed are respectively welded to the case means which are respectively stored in the storing recessed portions.

With use of a mounting structure for mounting a sensing element for measuring the load of a vehicle according to the first aspect of the invention, since, in the shaft member portion in which the storing recessed portion of the shaft member is formed, the portion of the shaft member with the fixing recessed portion formed therein is smaller in thickness than the portion of the shaft member with no fixing recessed portion formed therein in the diameter direction of the shaft member, in a state that the case means with the sensing element fixed to the interior portion thereof is stored in the storing recessed portion of the shaft member, when fixing the case means to the shaft member, the case means can be easily welded to the shaft member and such welding fixation of the case means makes it sure that the sensing element can be fixed to the shaft member through the case means.

Also, with use of a mounting structure for mounting a sensing element for measuring the load of a vehicle according to the first aspect of the invention, because the case means is fixed by welding to the shaft member, when the case means is formed such that it has an outer shape corresponding to the storing recessed portion, even the existence of a slight gap between the storing recessed portion and case means raises no problem and the case means can be easily united with the shaft member by the above-mentioned welding fixation, so that the vehicle load applied to the shaft member can be positively transmitted to the case means side and thus to the side of the sensing element fixed to the interior portion of the case means.

Therefore, when compared with a case in which the case means is press inserted into the storing recessed portion, there is eliminated the need to match even the dimension of the outside diameter of the case means to that of the storing recessed portion, or to finely set the surface roughnesses of the storing recessed portion and case means in order to obtain a necessary friction force between the inner periphery of the storing recessed portion and the outer periphery of the case means. This elimination not only can reduce the working costs of them to a sufficient degree but also eliminates the need to press insert the sensing element into the shaft member, which in turn prevents other forces than the load involved with the pressure insertion from being applied to the sensing element, so that an accurate output corresponding to the load can be obtained from the sensing element.

Further, with use of a mounting structure for mounting a sensing element for measuring the load of a vehicle according to the first aspect of the invention, since the sensing element is fixed to the interior portion of the case means, even if the sensing itself is not so formed as to have an outer shape which corresponds to the storing recessed portion, the structure on the sensing element side to be stored into the storing recessed portion, as a whole, has an outer shape which corresponds to the storing recessed portion. Due to this, regardless of the relationship of the posture of the sensing element side structure with respect to the storing recessed portion in the peripheral direction of the shaft member, the corresponding portion of the sensing element side structure can be always positioned in the shaft member portion in which the fixing recessed portion is formed.

Accordingly, even in the case of a sensing element which is not so formed as to have an outer shape corresponding to the storing recessed portion, the sensing element can be welded to the shaft member without matching the position of the sensing element to that of the shaft member in the peripheral direction of the shaft member, thereby being able to simplify an operation to assemble the sensing element into the shaft member.

Also, with use of a mounting structure for mounting a sensing element for measuring the load of a vehicle according to the second aspect of the invention, since the two sensing elements are respectively disposed in the two end portions of the shaft member, even when the load of the vehicle is biasedly applied to either of the two end portions of the shaft member in the axial direction of the shaft member, the accurate load of the vehicle can be obtained based on the outputs of the two sensing elements.

Further, with use of a mounting structure for mounting a sensing element for measuring the load of a vehicle according to the third aspect of the invention, after the fixing recessed portion of the shaft member is fixed by welding to the case means, if the section of the fixing recessed portion that is different in level from the outer peripheral surfaces of the remaining shaft member portions is filled up with fillers, then there can be removed the level difference of such section with respect to the outer peripheral surfaces of the remaining shaft member portions.

Still further, with use of a mounting structure for mounting a sensing element for measuring the load of a vehicle according to the fourth aspect of the invention, by forming the plurality of fixing recessed portions in the peripheral direction of the shaft member, the number of the shaft member portions to be welded to the case means can be increased to thereby be able to enhance the fixing strength of the case means with respect to the shaft member.

BRIEF DESCRIPTION OF THE DRAWINGS

FIG. 3 (*a*) is a section view of a first case assembly into which the sensing element shown in FIG. 2 is to be stored.

FIG. 3 (b) is a side view of the first case assembly.

FIG. 4 (a) is a section view of a second case assembly into which the sensing element shown in FIG. 2 is to be stored.

FIG. 4 (b) is a side view of the second case assembly.

FIG. 5 is a section view of a line passage pipe to be connected to one end of the second case assembly shown in FIG. 4.

FIG. 6 is a perspective view of a shackle pin according to the first embodiment, into which the first and second case assemblies with their respective sensing elements fixed to the interior portions thereof are mounted.

DETAILED DESCRIPTION OF THE INVENTION

Preferred embodiments of a structure for mounting a sensing element for measuring the load put on a vehicle according to the invention will now be described with reference to the accompanying drawings.

At first, a sensing element mounting structure according to a first embodiment of the invention will be described with reference to FIGS. 1 to 8.

Figure 1:
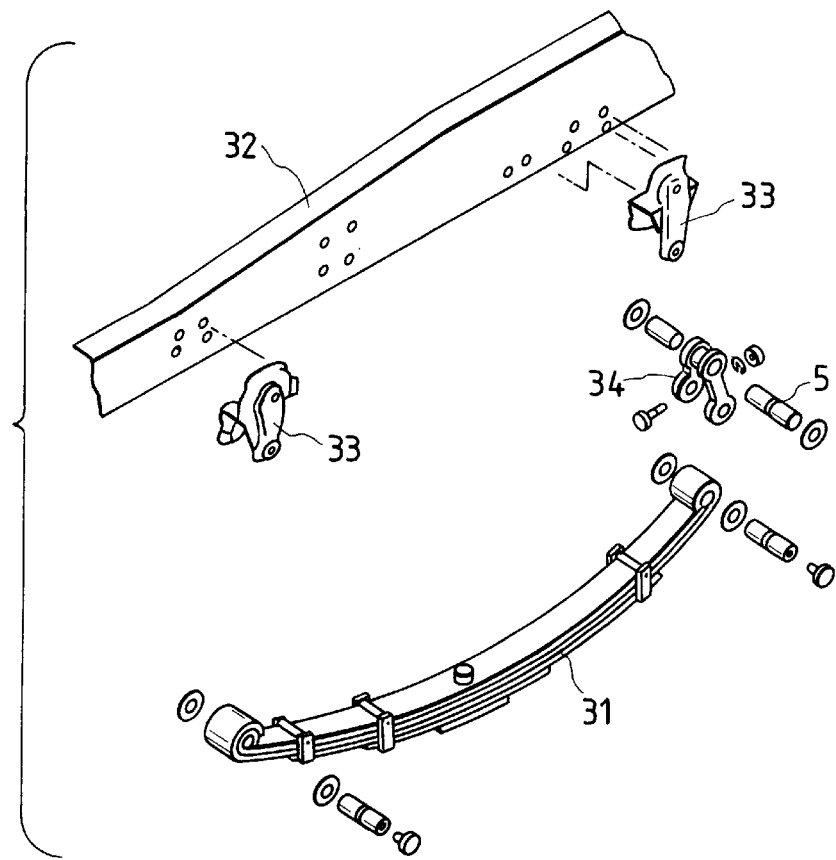
FIG. 1 is an exploded perspective view of a portion of a vehicle into which a sensing element to be mounted by a mounting structure according to a first embodiment of the invention is mounted.

FIG. 1 is an exploded perspective view of the portion of a vehicle to which a sensing element to be mounted by a mounting structure according to the first embodiment is disposed. In FIG. 1, a leaf spring 31 is connected to a load carrying platform 32 of the vehicle through a pair of brackets 33 each having one end which is forked and, between one end of the leaf spring 31 and bracket 33, there is interposed a shackle 34.

The shackle 34 is connected to the bracket 33 by a shackle pin 5 in such a manner that the shackle 34 can be swung. A mounting structure according to the invention is employed in the present shackle pin 5 when mounting a load measuring sensing element of, for example, a strain gauge sensor type or the like.

Figure 2:
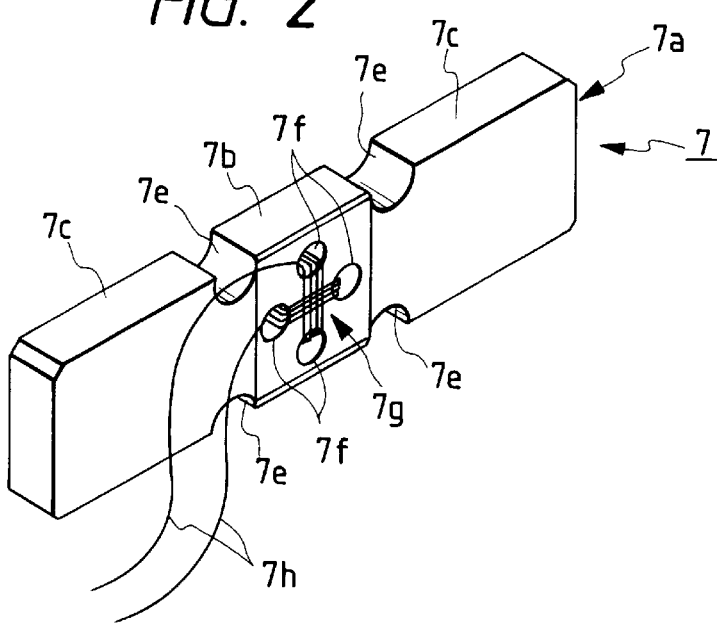
FIG. 2 is a perspective view of a sensing element to be stored into and fixed to a shackle pin shown in FIG. 1.

FIG. 2 is a perspective view of a sensing element which is to be stored into and fixed to the shackle pin 5 shown in FIG. 1, and a sensing element designated by reference character 7 in FIG. 2 includes a plate-like member 7a, and a coil 7g serving as a sensing part.

The plate-like member 7a is formed of magnetic material such as permalloy or the like in a flat and, when viewed in a plan view thereof, substantially rectangular shape, while the plate-like member 7a includes a coil portion 7b situated substantially centrally in the longitudinal direction thereof, and fixed portions 7c and 7c which are respectively located on the two sides of the coil portion 7b.

In the two edge portions of the plate-like member 7a in the width direction thereof intersecting at right angles to the above-mentioned longitudinal direction thereof, there are present a total of four edge portions which are formed by the boundary areas of the coil portion 7b and two fixed portions 7c and 7c. And, in these four edge portions, there are respectively formed four substantially semi-circular notch portions 7e which are used to relieve stresses applied to the plate-like member 7a. Also, in the coil portion 7b that is defined inside the four notch portions 7e, there are formed four through holes 7f which respectively extend through the coil portion 7b and are spaced from each other in the above-mentioned longitudinal and width directions.

The coil 7g includes two magnet wires 7h which form a cross coil, while these two magnet wires 7h are respectively covered with insulation material (not shown) such as enamel or the like.

One of the two magnet wires 7h is wound around the two through holes 7f and 7f which are opposed to each other in the above-mentioned longitudinal direction, while the two ends thereof are drawn out from their respective through holes 7f and 7f. The other magnet wire 7h is wound around the remaining two through holes 7f and 7f which are opposed to each other in the above-mentioned width direction, while the two ends thereof are drawn out from their respective through holes 7f and 7f.

FIGS. 3(a) and 3(b) are respectively a section view and a side view of a first case assembly according to the first embodiment into the interior portion of which the sensing element 7 is to be fixed, and the first case assembly designated by reference character 9 in FIGS. 3(a) and 3(b) shows a cylindrical shape which is closed in one end thereof and includes a bottom.

The inside diameter of the first case assembly 9 (which corresponds to the case means as set forth in the appended claims), as shown in FIG. 3(a), is set such that it is substantially coincident with the width direction dimension of the plate-like member 7a of the sensing element 7.

Also, in a state where the sensing element 7 is stored into the interior portion of the first case assembly 9 and is pushed down to the bottom side thereof, in the four outer peripheral surface portions of the first case assembly 9 which respectively face the two width direction edges of the two fixed portions 7c and 7c of the plate-like member 7a, there are formed recessed portions 9a which are respectively used to fix the edge portions of the two fixed portions 7c and 7c to the inner peripheral surface of the first case assembly 9 by laser spot welding.

Further, in the outer surface portions of the first case assembly 9 that are shifted by 90° in the peripheral direction of the first case assembly 9 from the above-mentioned recessed portions 9a, as shown in FIG. 3(b), there are formed a pair of recessed grooves 9b for line passage in such a manner that they extend across the two ends of the first case assembly 9.

FIGS. 4(a) and 4(b) are respectively a section view and a side view of a second case assembly according to the first embodiment of the invention to the interior portion of which the sensing element 7 is to be fixed, while the second case assembly designated by reference character 11 in FIGS. 4(a) and 4(b) shows a cylindrical shape.

The outside diameter of the second case assembly 11 (which corresponds to the case member) is set as a dimension which is substantially equal to the outside diameter of the first case assembly 9, while the inside diameter of the second case assembly 11, as shown in FIG. 4(a), is set such that it is substantially coincident with the width direction dimension of the plate-like member 7a of the sensing element 7. The inside diameter of one end 11c of the second case assembly 11 is set smaller than the width direction dimension of the plate-like member 7a.

Also, in a state where the sensing element 7 is stored into the interior portion of the second case assembly 11 from the other end lid thereof and is pushed down to one end 11c thereof, as shown in FIG. 4(a), in the four outer peripheral surface portions of the second case assembly 11 which respectively face the two width direction edges of the two fixed portions 7c and 7c of the plate-like member 7a, there are formed recessed portions 11a which are respectively used to fix the edge portions of the two fixed portions 7c and 7c to the inner peripheral surface of the second case assembly 11 by laser spot welding.

Further, in the outer surface portions of the second case assembly 11 that are shifted by 90° in the peripheral direction of the second case assembly 11 from the above-mentioned recessed portions 11a, as shown in FIG. 4(b), there are formed a pair of recessed grooves 11b in such a manner that they extend between the two ends 11c and 11d of the second case assembly 11.

FIG. 5 is a section view of a line passage pipe 13 which is connected to one end 11c of the second case assembly 11 that is formed as a small diameter end.

The line passage pipe 13 shows a cylindrical shape and the inside diameter thereof is set as a dimension which permits the two lead portions or magnet wires 7h respectively covered with the above-mentioned insulation material to be inserted into the line passage pipe 13.

The outer peripheral surface portion of the line passage pipe 13 on the base end 13a side thereof, as shown in FIG. 4 (a), is formed slightly smaller in diameter than the remaining outer peripheral surface portions of the line passage pipe 13 so that it can substantially coincide with the inside diameter of one end 11c of the second case assembly 11, whereas the outer peripheral surface portion of the leading end 13b side of the line passage pipe 13 is formed in a forwardly tapered manner.

FIG. 6 is a perspective view of a shackle pin 5 according to the first embodiment of the invention, onto the two ends of which there can be mounted the first and second case assemblies 9 and 11 respectively having their respective sensing elements 7 fixed to the respective interior portions thereof. The shackle pin 5 shows a substantially cylindrical outer shape. In the outer peripheral surface portion of the shackle pin 5 that is located near to one end 5a thereof in the axial direction thereof, there is formed an annular groove 5c (see FIG. 7) engageable with the peripheral surface of a fixing bolt (not shown) which, in a state where the shackle pin 5 is inserted from the other end 5b side in order to match the bracket 33 and shackle 34 in position to each other and connect them together, positions the shackle pin 5 with respect to the bracket 33 and shackle 34 in the axial direction of the shackle pin 5; and, in the outer peripheral surface portion of the shackle pin 5 that is located near to the other end 5b thereof, there is also formed a similar groove 5c which is symmetrical with the former groove 5c in position.

Also, in the outer peripheral surface portion of the shackle pin 5 that is located in the intermediate portion in the axial direction of the shackle pin 5, there is formed a grease groove 5p which has an arc-shaped section.

Further, in the outer peripheral surf ace portions of the shackle pin 5 which are slightly nearer to the grease groove 5p than the grooves 5c and are shifted by 180° in the peripheral direction of the shackle pin 5, there are respectively formed long grooves 5n (which correspond to the fixing recessed portions) which extend along the axial direction of the shackle pin 5.

Figure 7:
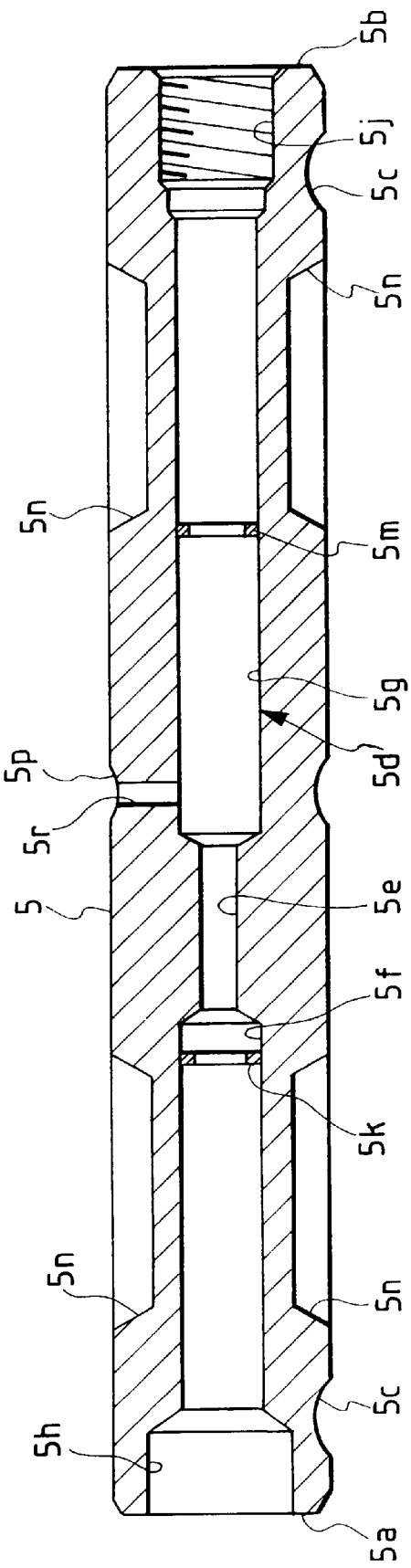
FIG. 7 is a section view of the shackle pin shown in FIG. 6.

FIG. 7 is a section view of the arrangement of a sensing element when it is disposed within the shackle pin, while the shackle pin 5 includes a through hole 5d which extends from one end 5a thereof to the other end 5b thereof.

The above-mentioned through hole 5d includes a small diameter portion 5e which is slightly nearer to on end 5a than the central portion of the shackle pin 5, first and second middle diameter portions 5f and 5g (which correspond to the storing recessed portions as set forth in the appended claims) which respectively adjoin the two sides of the small diameter portion 5e in the axial direction thereof, a first large diameter portion 5h which extends from one end 5a to the first middle diameter portion 5f, and a second large diameter portion 5j which extends from the other end 5b to the second diameter portion 5g.

The small diameter portion 5e is so formed as to have an inside diameter which is substantially coincident with the outside diameter of the line passage pipe 13; the first and second middle diameter portions 5f and 5g respectively include the interior portions which correspond to the outer shapes of the first and second case assemblies 9 and 11, while the inside diameters of the first and second middle diameter portions 5f and 5g are set slightly larger than the outside diameters of the first and second case assemblies 9 and 11, and are also set equal to each other; and, the first and second large diameter portions 5h and 5j are respectively formed such that the inside diameters thereof are set larger than the inside diameters of the first and second middle diameter portions 5f and 5g.

In the respective intermediate portions of the first and second middle diameter portions 5f and 5g in the axial direction of the shackle pin 5, there are respectively formed stopper grooves 5k and 5m which function as stoppers when the first and second case assemblies 9 and 11 are inserted into the first and second middle diameter portions 5f and 5g; and, from a portion of the second diameter portion which is located near to the small diameter portion 5e to the grease groove 5p, there is formed a grease supply hole 5r which extends through the shackle pin 5 along the diameter direction of the shackle pin 5.

Also, in the first embodiment, the long grooves 5n are respectively situated on the respective portions of the outer peripheral surface of the shackle pin 5 which are positioned outwardly in the diameter direction of the shackle pin 5, with respect to the respective portions of the first and second middle diameter portions 5f and 5g which are located nearer to the first and second large diameter portions 5h and 5j than the stopper grooves 5k and 5m.

Figure 8:
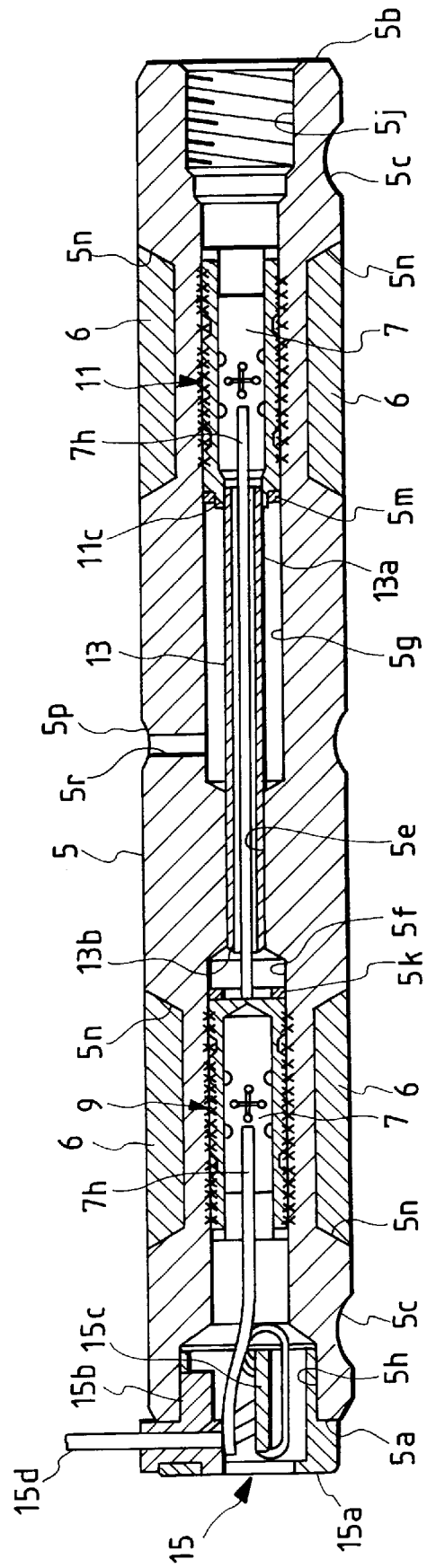
FIG. 8 is a section view of a sensing element mounting structure according to the first embodiment of the invention.

Next, how to mount the sensing element 7 into the shackle pin 5 according to the first embodiment structured in the above-mentioned manner, will be described with reference to FIG. 8 which is a section view of the sensing element mounting structure according to the first embodiment.

At first, the base end 13a of the line passage pipe 13 is connected to one end 11c of the second case assembly 11, the sensing element 7 is stored into the interior portion of the second case assembly 11, and the two lead wire portions 7h of the sensing element 7 are pulled out externally from the leading end 13b of the line passage pipe 13.

Next, in this state, the sensing element 7 is positioned with respect to the second case assembly 11 in the peripheral direction of the second case assembly 11 in such a manner that the two edge portions of the two fixed portions 7c and 7c of the sensing element 7 in the width direction of the plate-like member 7a can be made to face the recessed portions 11a of the second case assembly 11a laser beam is radiated onto the recessed portions 11a to thereby fix together the inner peripheral surface of the second case assembly 11 and the two fixed portions 7c and 7c of the sensing element 7 by laser spot welding, and, after then, a mold agent (not shown) is put into the interior portion of the second case assembly 11, thereby fixing the sensing element 7 to the interior portion of the second case assembly 11.

After the fixation of the sensing element 7 to the second case assembly 11 is completed, not only while inserting the line passage pipe 13 through the second large diameter portion 5j and second middle diameter portion 5g of the shackle pin 5 into the small diameter portion 5e, but also while adjusting the posture of the second case assembly 11 to the shackle pin 5 in the peripheral direction thereof in such a manner that the plate-like member 7a of the sensing element 7 can be positioned on a line connecting together the two long grooves 5n corresponding to the second middle diameter portion 5g of the shackle pin 5, the second case assembly 11 is inserted into the second middle diameter portion 5g.

When one end 11c of the second case assembly 11 is engaged with the stopper groove 5m of the second middle diameter portion 5g, the lead wire portions 7h of the sensing element 7 are drawn out toward the first middle diameter portion 5f from the leading end 13b of the line passage pipe 13 that has arrived at the boundary position between the small diameter portion 5e and second middle diameter portion 5f and, further, the leading ends of the lead wire portions are drawn out externally of the first large diameter portion 5h. In this state, a laser beam is radiated onto the respective long grooves 5n and 5n to thereby fix together the inner peripheral surface of the second middle diameter portion 5g and the outer peripheral surface of the second case assembly 11 by laser spot welding, so that the second case assembly 11 can be fixed to the second middle diameter portion 5g.

After then, similarly to the fixation of the sensing element 7 to the first case assembly 9, the sensing element 7 is positioned with respect to the first case assembly 9 in the peripheral direction of the first case assembly 9 in such a manner that the two edge portions of the two fixed portions 7c and 7c of the sensing element 7 in the width direction of the plate-like member 7a can be made to face the recessed portions 9a of the first case assembly 9, a laser beam is radiated onto the recessed portions 9a to thereby fix together the inner peripheral surface of the first case assembly 9 and the two fixed portions 7c and 7c of the sensing element 7 by laser spot welding, and, after then, a mold agent (not shown) is put into the interior portion of the first case assembly 9, thereby fixing the sensing element 7 to the interior portion of the first case assembly 9.

After the fixation of the sensing element 7 to the first case assembly 9 is completed, in a state where the lead wire portions 7h of the sensing element 7 of the second case assembly 11 with the leading ends of the lead wire portions 7h drawn out externally from the first large diameter portion 5h are stored in the line passage recessed grooves 9b of the first case assembly 9, while adjusting the posture of the first case assembly 9 to the shackle pin 5 in the peripheral direction thereof in such a manner that the plate-like member 7a of the sensing element 7 can be positioned on a line connecting together the two long grooves 5n corresponding to the first middle diameter portion 5f of the shackle pin 5, the first case assembly 9 is inserted into the first middle diameter portion 5f of the shackle pin 5.

When the end of the bottom of the first case assembly 9 is engaged with the stopper groove 5k, the lead wire portions 7h of the sensing element 7 of the first case assembly 9 are drawn out toward the first large diameter portion 5h from the open end portion of the first case assembly 9 and, after then, the thus drawn-out lead wire portions 7h as well as the lead wire portions 7h of the sensing element 7 of the second case assembly 11, which are drawn out onto the first large diameter portion 5h through a gap between the first middle diameter portion 5f and the line passage recessed grooves 9b of the first case assembly 9, are drawn out externally of the first large diameter portion 5h.

After the lead wire portions 7h and 7h of the respective sensing elements 7 are drawn out externally of the first large diameter portion 5h, a laser beam is radiated onto the respective long grooves 5n and 5n to thereby fix together the inner peripheral surface of the first middle diameter portion 5f and the outer peripheral surface of the first case assembly 9 by laser spot welding, so that the first case assembly 9 can be fixed to the first middle diameter portion 5f.

After then, a grease (not shown) for reducing friction between the outer periphery of the shackle pin 5 and the corresponding inner wall (not shown) of the shackle 34 is fully inserted into the portion of the second middle diameter portion 5g that is located nearer to the small diameter portion 5b than the stopper groove 5m from a space between the recessed groove 11b of the second case assembly 11 and the second middle diameter portion 5g. Next, a plug (not shown) is fitted into the second large diameter portion 5j to thereby close the other end 5b side of the shackle pin 5.

Further, a cap assembly 15, which is composed of a metal cap main body 15a and a rubber bush 15b, is fitted into the first large diameter portion 5h to thereby close the one end 5a side of the shackle pin 5 and, in this fitting and closing operation, the lead wire portions 7h and 7h of the sensing elements 7 of the first and second case assemblies 9 and 11 are switched over to a large diameter lead wire 15d on a relay base plate 15c which is supported by the rubber bush 15b, and the large diameter lead wire 15d is drawn out externally of the shackle pin 5.

Finally, a mold agent 6 (which corresponds to the fillers) is fully put into the respective long grooves 5n and 5n formed in the two end portions of the shackle pin 5, thereby completing the mounting of the sensing element 7 into the shackle pin 5.

As described above, in the mounting structure for mounting the sensing element 7 according to the first embodiment of the invention, the first and second case assemblies 9 and 11 with their respective sensing elements 7 stored in and fixed to the interior portions thereof are respectively stored into the first and second middle diameter portions 5f and 5g which not only are respectively located nearer to the two ends 5a and 5b of the through hole 5d so formed as to extend from one end 5a to the other end 5b of the shackle pin but also respectively correspond in shape to the first and second case assemblies 9 and 11, and a laser beam is radiated onto the long grooves 5n and 5n which not only are formed in the outer peripheral surface portions of the shackle pin 5 corresponding to the first and second middle diameter portions 5f and 5g and shifted in phase by 180° in the peripheral direction of the shackle pin 5 but also respectively extend in the axial direction of the shackle pin 5 to thereby fix the inner peripheral surfaces of the first and second middle diameter portions 5f and 5g to the outer peripheral surfaces of the first and second case assemblies 9 and 11 by laser spot welding, so that the first and second case assemblies 9 and 11 can be fixed to the first and second middle diameter portions 5f and 5g of the shackle pin 5.

Due to this, in the portions of the shackle pin 5 where the first and second middle diameter portions 5f and 5g are formed, the portions in which the long grooves 5n and 5n of the shackle pin 5 are formed are smaller in thickness in the diameter direction of the shackle pin 5 than the portions in which the long grooves 5n and 5n are not formed. That is, in a state where the first and second case assemblies 9 and 11 having their respective sensing elements 7 fixed to their respective interior portions are stored in the first and second middle diameter portions 5f and 5g of the shackle pin 5, when fixing the first and second case assemblies 9 and 11 to the shackle pin 5 they can be easily fixed together by welding and, due to such welding fixation, the sensing elements 7 can be surely fixed to the shackle pin 5 through the first and second case assemblies 9 and 11.

Also, in the mounting structure for mounting the sensing element 7 according to the first embodiment of the invention, since the first and second case assemblies 9 and 11 are fixed by welding to the shackle pin 5, when the first and second case assemblies 9 and 11 are so formed as to correspond in the outer shapes thereof to the first and second middle diameter portions 5f and 5g, even if there exists a slight gap between the first and second middle diameter portions 5f, 5g and the first and second case assemblies 9 and 11, such slight gap raises no problem. That is, due to the above-mentioned welding fixation, the first and second case assemblies 9 and 11 can be easily united with the shackle pin 5 into an integral body, so that the load of the vehicle applied to the shackle pin 5 can be positively transmitted to the first and second case assemblies 9 and 11 and the sensing elements 7 stored in and fixed thereto.

Therefore, when compared with a case in which the first and second case assemblies 9 and 11 are press inserted into the first and second middle diameter portions 5f and 5g, there is eliminated the need to match even the outside diameter dimensions of the first and second case assemblies 9 and 11 to the dimensions of the first and second middle diameter portions 5f and 5g, or the need to set finely the surface roughnesses of the inner peripheral surfaces of the first and second middle diameter portions 5f and 5g and the outer peripheral surfaces of the first and second cage assemblies 9 and 11 in order to obtain a necessary friction force between them, so that the working costs of them can be reduced to a sufficient degree.

Further, in the mounting structure for mounting the sensing element 7 according to the first embodiment of the invention, the sensing elements 7 are respectively fixed to the interior portions of the first and second case assemblies 9 and 11. Therefore, even when the sensing element 7 itself is not formed in such a shape that corresponds to the substantially cylindrical first and second middle diameter portions 5f and 5g of the shackle pin 5, because the first and second case assemblies 9 and 11 to be respectively stored into the first and second middle diameter portions 5f and 5g are so formed as to have substantially cylindrical shapes which correspond to the first and second middle diameter portions 5f and 5g, the first and second case assemblies 9 and 11 can be always positioned such that the outer peripheral surfaces thereof face the portions of the shackle pin 5 in which the long grooves 5n are formed, regardless of the relationship, in the peripheral direction of the shackle pin 5, of the postures of the first and second case assemblies 9 and 11 with respect to the first and second middle diameter portions 5f and 5g.

Thus, even in the case of a sensing element 7 which is not so formed as to have an outer shape that corresponds to the first and second middle diameter portions 5f and 5g, such sensing element 7 can be easily fixed by welding to the shackle pin 5 without positioning it with fine accuracy relative to the shackle pin 5 in the peripheral direction of the shackle pin 5, which makes it possible to simplify an operation to assemble or mount the sensing element 7 into the shackle pin 5.

In other words, when compared with the prior art, there is eliminated the need to work, with high precision, one of the fixed members of the sensing element 7 as well as the inner peripheral wall portions of the first and second large diameter portions 5h and 5j that respectively correspond to the fixed member of the sensing element 7 into frustums of right cone each having a forwardly tapered surface.

Further, there is also eliminated the need to execute the following operation: that is, in order that the tapered surface of the fixed member can be closely engaged with the tapered surfaces of the first and second large diameter portions 5h and 5j, key grooves are formed in the respective outer peripheries of the first and second case assemblies 9 and 11, after the first and second case assemblies 9 and 11 are inserted into the first and second large diameter portions 5h and 5j respectively, wedge-shaped keys are pressure inserted into the above-formed key grooves while controlling the degree of the insertion pressure properly, and, by applying a certain degree of force to the keys, the bottom end portions of the first and second case assemblies 9 and 11 as well as one end 11c are pressed against the stopper grooves 5k and 5m side.

This can simplify a process for assembling or mounting the sensing element 7 into the shackle pin 5 to thereby be able to reduce the manufacturing cost of the mounting structure. Also, elimination of the need to pressure insert the sensing element 7 side into the shackle pin 5 can prevent other forces than the load involved in the pressure insertion from being applied to the sensing element 7, so that an accurate output corresponding to the load of the vehicle can be obtained from the sensing element 7.

Also, in the mounting structure for mounting the sensing element 7 according to the first embodiment of the invention, the mold agent 6 is fully put into the long grooves 5n of the shackle pin 5 welded to the first and second case assemblies 9 and 11. Due to this structure, after the long grooves 5n of the shackle pin 5 are welded to the first and second case assemblies 9 and 11, it is possible to remove a level difference between the outer peripheral surface of the long groove 5n portion and the outer peripheral surface of the shackle pin 5 portion around the long grooves 5n.

Further, in the mounting structure for mounting the sensing element 7 according to the first embodiment of the invention, the two long grooves 5n are formed on the outer peripheral surface of the shackle pin 5 portion where the first and second middle diameter portions 5f and 5g are formed in such a manner that the long grooves 5n are shifted in phase by 180° in the peripheral direction of the shackle pin 5, and, in the two long grooves 5n, the inner peripheral surfaces of the first and second middle diameter portions 5f and 5g are respectively welded to the first and second case assemblies 9 and 11. Due to this, by increasing the number of the portions of the shackle pin 5 to be fixed by welding to the first and second case assemblies 9 and 11, the fixing strengths of the first and second case assemblies 9 and 11 with respect to the shackle pin 5 can be enhanced.

Next, a sensing element mounting structure according to a second embodiment of the invention will be described with reference to FIGS. 9 and 10.

Figure 9:
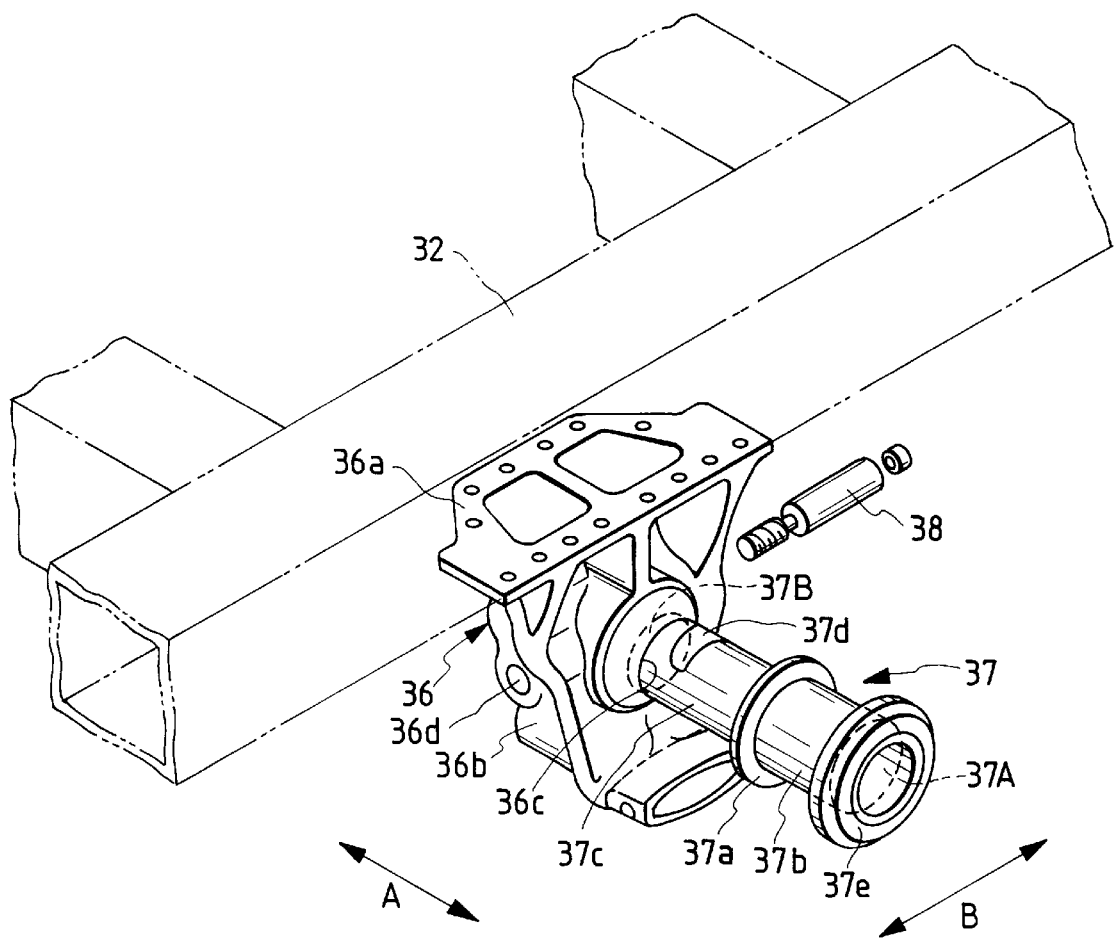
FIG. 9 is a perspective view of a portion of a vehicle into which a sensing element to be mounted by a mounting structure according to a second embodiment of the invention is mounted.

FIG. 9 is a perspective view of a trunnion shaft part of a vehicle to which a sensing element to be mounted by a mounting structure according to the second embodiment is applied. In FIG. 9, reference character 37 designates a trunnion shaft, and 36 stands for a trunnion bracket on which the trunnion shaft 37 is to be mounted.

The trunnion bracket 36 includes a flat-plate-shaped flange 36a and a support portion 36b which is provided on and projected from one surface of the flange 36a.

In the support portion 36b, there is formed a through hole 36c which extends in parallel to the flange 36a and, in the support portion 36b section that is located slightly nearer to the flange 36a than the through hole 36c, there is formed a pin hole 36d which intersects at right angles to the through hole 36c and extends through the support portion 36b in parallel to the flange 36a, while the pin hole 36d communicates with the through hole 36c within the interior portion of the support portion 36b.

To mount the flange 36a, the trunnion bracket 36 is arranged in such a direction that the through hole 36c extends along the width direction A of the vehicle and the pin hole 36d extends along the longitudinal direction B of the vehicle, and the opposite side surface of the flange 36a to the flange 36a surface with the support portion 36b provided thereon is butted against the lower surface of the load carrying platform 33 of the vehicle. That is, in this state, the flange 36a is mounted onto and fixed to the load carrying platform 33 by use of bolts and nuts (not shown).

On the other hand, the trunnion shaft 37 is formed as a cylindrical shape which has an outside diameter corresponding to the inside diameter of the through hole 36c and is sufficiently larger in length than the axial dimension of the through hole 36c. Also, the trunnion shaft 37 includes an annular flange 37a which is provided on and projected from the outer peripheral surface of the trunnion shaft 37 and is located substantially in the central portion of the trunnion shaft 37 in the axial direction thereof.

In the trunnion shaft 37, a suspension support portion 37b is formed by the trunnion shaft 37 section which extends from the flange portion 37a to the one end 37A side of the trunnion shaft 37, while an insertion portion 37c having a length corresponding to the through hole 36c is formed by the trunnion shaft 37 section which extends from the flange 37a to the other end 37B side thereof.

Figure 10:
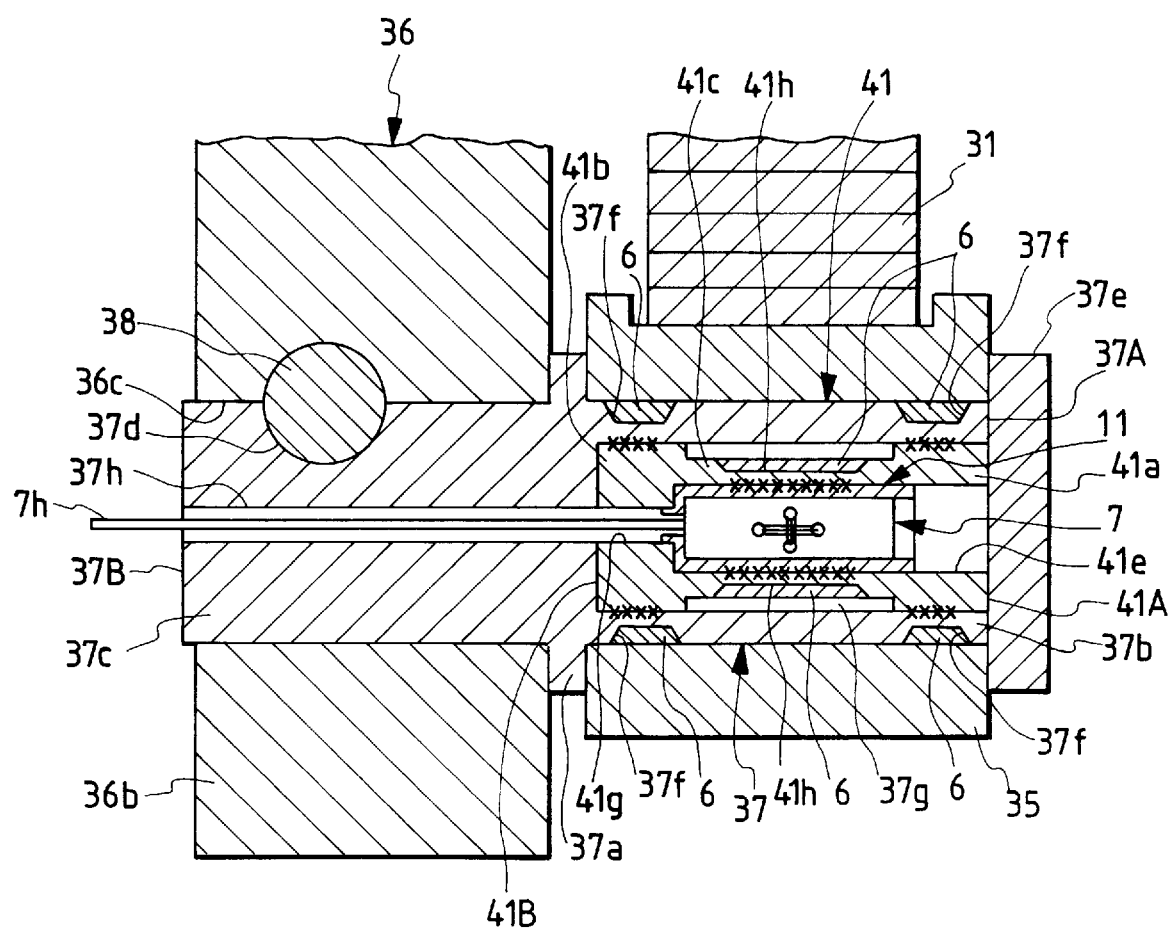
FIG. 10 a section view of a sensing element mounting structure according to the second embodiment of the invention.

The insertion portion 37c is structured in the following manner: that is, the insertion portion 37c is inserted into the through hole 36c of the trunnion bracket 36 toward the center side from the outer side in the vehicle width direction A until the flange 37a is butted against the support portion 36b section of the peripheral edge of the through hole 36c, whereby one end 37A of the trunnion shaft 37 is positioned on the outer side in the vehicle width direction A and the other end 37B thereof is positioned on the center side in the vehicle width direction A; and, in this state, in the mutually communicating position between the through hole 36c and pin hole 36d, a fixing bolt 38 inserted into the pin hole 36d, as shown in FIG. 10 which is a section view of the present mounting structure, can be engaged with a recessed groove 37d having a substantially semicircular section which is formed in the outer peripheral surface of the insertion portion 37c, in more particular, in the outer peripheral surface section that is located nearer to the other end 37B of the trunnion shaft 37.

Also, on the suspension support portion 37b, there is mounted an annular spring support member 35 which is coated with grease (not shown) and is used to support a leaf spring 31 functioning as the suspension of the vehicle. In the portion of the trunnion shaft 37 that extends from one end 37A of the trunnion shaft 37 to the portion of the end face of the spring support member 35 extending over the end face portion of the peripheral edge of one end 37A of the trunnion shaft 37, there is removably mounted a cap 37e in order to prevent the grease from leaking externally from the boundary portion between the outer peripheral surface of the suspension support portion 37b and the inner peripheral surface of the spring support portion 35.

Next, a mounting structure according to the second embodiment of the invention to be employed in mounting a sensing element 7 into the interior portion of the above-mentioned trunnion shaft 37 will be described with reference to FIG. 10.

In FIG. 10, reference character 41 designates an outer case assembly to which a sensing element 7 fixed by welding to the interior portion of the second case assembly 11 can be stored and fixed together with the second case assembly 11. The outer case assembly 41 comprises two large diameter portions 41a and 41b which are respectively located in the two end portions of the outer case assembly 41 in the axial direction thereof, and a small diameter portion 41c which located between the two large diameter portions 41a and 41b. In one end 41A of the outer case assembly 41, there is opened up an insertion hole 41e which extends toward the other end 41B along the axial direction of the outer case assembly 41.

The insertion hole 41e is formed in such a manner that it has a depth larger than the length of the second case assembly 11 in the axial direction thereof and had an inside diameter slightly larger than the outside diameter of the second case assembly 11.

Further, in the outer case assembly 41, there is formed a through hole 41g which extends from the insertion hole 41e to the other end 41B along the axial direction of the outer case assembly 41 and coaxially with the insertion hole 41e. In particular, this through hole 41g is formed such that it has an inside diameter which is smaller than the inside diameter of the insertion hole 41e but allows the lead wire portion 7h of the sensing element 7 to be inserted through the through hole 41g.

In the portions of the outer peripheral surface of the small diameter portion 41c of the outer case assembly 41 that are shifted from each other in phase by 180° in the peripheral direction of the outer case assembly 41, there are formed two long grooves 41h which respectively extend along the axial direction of the outer case assembly 41.

On the other hand, in the portions of the outer peripheral surface of the suspension support portion 37b of the trunnion shaft 37 that are spaced from each other in the axial direction of the trunnion shaft 37 by a distance equal to the distance between the two large diameter portions 41a and 41b of the outer case assembly 41, there are respectively formed two long grooves 37f and 37f (which correspond to the fixing recessed portions) which respectively extend along the axial direction of the trunnion shaft 37. Also, in the portions that are shifted from these two long grooves 37f and 37f by 180° in the peripheral direction of the trunnion shaft 37, there are respectively formed similar long grooves 37f and 37f.

Further, in one end 37A of the trunnion shaft 37, there is opened up an insertion hole 37g which extends toward the other end 37B of the trunnion shaft 37 along the axial direction of the trunnion shaft 37.

The insertion hole 37g (which corresponds to the storing recessed portion) is formed such that it has a depth larger than the length of the outer case assembly 41 in the axial direction thereof and an inside diameter slightly larger than the outside diameter of the outer case assembly 41.

Moreover, in the trunnion shaft 37, there is formed a through hole 37h which extends from the insertion hole 37g to the other end 37B of the trunnion shaft 37 along the axial direction of the trunnion shaft 37 and coaxially with the insertion hole 37g. The through hole 37h is formed such that it has an inside diameter which is smaller than the inside diameter of the insertion hole 37g but allows the lead wire portion 7h of the sensing element 7 to be inserted through the through hole 37h.

Next, how to mount the sensing element 7 into the above-structured trunnion shaft 37 according to the second embodiment of the invention will be described.

At first, similarly to the first embodiment, the sensing element 7 is stored into the interior portion of the second case assembly 11, the lead wire portions 7h of the sensing element 7 are drawn out externally of the second case assembly 11 from one end 11 thereof, and the two edge portions of the two fixed portions 7c and 7c of the sensing element 7 in the width direction of the plate-like member 7a are respectively made to face the recessed portions 11a. In this state, a laser beam is radiated onto the recessed portions 11a to thereby fix the second case assembly 11 to the sensing element by laser spot welding. Then a mold agent is fully put into the interior portion of the second case assembly 11, so that the sensing element 7 can be fixed to the interior portion of the second case assembly 11.

Next, the lead wire portions 7h pulled out externally of the second case assembly 11 from the second case assembly 11 are inserted into the insertion hole 41e from the one end 41A side of the outer case assembly 41 and, further, while inserting the lead wire portions 7h through the through hole 41g and pulling them out to the other end 41B side of the outer case assembly 41, the second case assembly 11 is inserted into the insertion hole 41e from the one end 11c side thereof in such a manner that the plate-like member 7a of the sensing element 7 can be positioned on a line connecting together the two long grooves 41h and 41h of the small diameter portion 41c of the outer case assembly 41.

If the second case assembly 11 is inserted into the insertion hole 41e until one end 11c of the second case assembly 11 is butted against the portion of the insertion hole 41 where the insertion hole 41 is different in level from the through hole 41g, then a laser beam is radiated onto the respective long grooves 41h and 41h to fix the inner peripheral surface of the insertion hole 41e to the outer peripheral surface of the second case assembly 11 by laser spot welding, thereby fixing the second case assembly 11 to the outer case assembly 41, and then, the respective long grooves 41h and 41h are filled up with a mold agent.

Next, the lead wire portions 7h drawn out externally from the other end 41B of the outer case assembly 41 are inserted into the insertion hole 37g from one end 37 of the trunnion shaft 37 and, further, while inserting the lead wire portions 7h through the through hole 37h and drawing them out toward the other end 37B side of the trunnion shaft 37, the second case assembly 11 is inserted into the insertion hole 37g from the one end 11c side thereof in such a manner that the plate-like member 7a of the sensing element 7 can be positioned on a line connecting together the two long grooves 37f and 37f formed shifted in phase by 180° in the peripheral direction of the trunnion shaft 37.

In this state, since the two large diameter portions 41a and 41b of the outer case assembly 41 are positioned, in the diameter direction of the trunnion shaft 37, in the portions which respectively correspond to the two long grooves 37f and 37f spaced from each other in the axial direction of the trunnion shaft 37, a laser beam is radiated onto a total of four long grooves 37f to fix the inner peripheral surface of the insertion hole 37g to the outer peripheral surface of the outer case assembly 41 by laser spot welding, thereby fixing the outer case assembly 41 to the trunnion shaft 37, and then the four long grooves 37f are respectively filled up with a mold agent. This completes the mounting of the sensing element 7 into the trunnion shaft 37.

By the way, in the second embodiment, "the case means", which is set forth in the appended claims, is composed of the second case assembly 11 and the outer case assembly 41 which stores the second case assembly 11 therein.

With use of the thus structured sensing element mounting structure according to the second embodiment as well, there can be obtained a similar effect to the sensing element mounting structure according to the first embodiment.

By the way, in the first embodiment, description has been given of a case in which the sensing elements 7 are respectively stored into and fixed to the two end portions of the shackle pin 5 through the first and second case assemblies 9 and 11. However, as in the trunnion shaft 37 of the second embodiment, the present invention can also apply to a case in which the sensing element is, through the case means, stored into and fixed to only one end side of a shaft member to which the load of the vehicle is applied.

Also, in the above-mentioned second embodiment, there is employed the structure in which the sensing element 7 is stored into the insertion hole 37g of the trunnion shaft 37 using the dual case means composed of the second case assembly 11 and outer case assembly 41. However, the case means, which is used to store and fix the sensing element to the shaft member, may consist of a single case assembly or may be composed of three or more case assemblies.

By the way, as in the trunnion shaft 37 which is employed as a shaft member in the second embodiment, when mounting the sensing element 7 to a shaft member which is larger in diameter than the shackle pin 5 employed in the first embodiment, if the case means is composed of two or more case assemblies, then the diameter of the sensing element side can be made larger and the depth of the fixing recessed portions forming the shaft member can be prevented from becoming larger than necessary. This can prevent the possibility that the shaft member portions where the fixing recessed portions are formed can be greatly smaller in thickness than the remaining portions and can be thereby weaker in strength.

That is, when compared with the prior art, there is eliminated the need to work, with high precision, one of the fixed members of the sensing element as well as the inner peripheral wall portions of the first and second large diameter portions 5h and 5j corresponding to the present fixed member respectively into a frustum-like shape having a forwardly tapered surface.

Also, there can be avoided the following operation: that is, the key grooves are respectively formed in the outer peripheries of the first and second case assemblies 9 and 11 in such a manner that the tapered surfaces of the fixed member as well as the first and second large diameter portions 5h and 5j can be closely engaged with each other; and, after the first and second case assemblies 9 and 11 are inserted into the first and second large diameter portions 5h and 5j, the wedge-shaped keys are respectively press inserted into the key grooves while controlling the insertion pressure properly, and the bottom end portion and one end 11c of the first and second case assemblies 9 and 11 are respectively pressed against the stopper grooves 5k and 5m while applying a certain degree of force thereto.

Therefore, the process for assembling or mounting the sensing element 7 into the shackle pin 5 can be simplified and the manufacturing costs of the present mounting structure can be thereby reduced.

Also, in the above-mentioned first and second embodiments, the long grooves 5n and 37f of the shackle pin 5 and trunnion shaft 37 are formed in the portions that are shifted by 180° in the peripheral direction of the shackle pin 5 and trunnion shaft 37. However, the invention is not limited to this. For example, only one long groove 5n or 37f may be formed in the whole periphery of the shackle pin 5 or trunnion shaft 37 in the peripheral direction thereof, or three or more long grooves 5n or 37f may be formed at intervals in the peripheral direction of the shackle pin 5 or trunnion shaft 37.

Further, in the above-mentioned first and second embodiments, description has been given of the two ends 5a and 5b of the shackle pin 5 which are used to connect the bracket 33 and shackle 34 to each other, and the mounting structure for mounting the sensing element 7 into the trunnion shaft 37. However, these are not limitative but it goes without saying that the invention can be widely applied when a sensing element for measuring the load of the vehicle is to be mounted to any shaft members of the vehicle to the two ends of which the load of the vehicle is applied dispersively.

As has been described hereinbefore, according to the first aspect of the invention, there is provided a mounting structure for mounting a sensing element for measuring a vehicle load into a shaft member to which the vehicle load is applied, which comprises: a storing recessed portion formed in the end portion of the shaft member and extending along the axial direction of the shaft member; a fixing recessed portion formed in the outer peripheral surface of the portion of the shaft member where the storing recessed portion of the shaft member is formed; and, case means to which the sensing element is to be fixed and also which is to be stored into the storing recessed portion, while the shaft member portion in which the fixing recessed portion of the shaft member is formed is fixed by welding to the case means stored in the storing recessed portion.

By the above structure, since, in the shaft member portion in which the storing recessed portion of the shaft member is formed, the portion of the shaft member with the fixing recessed portion formed therein is smaller in thickness than the portion of the shaft member with no fixing recessed portion formed therein in the diameter direction of the shaft member, in a state that the case means with the sensing element fixed to the interior portion thereof is stored in the storing recessed portion of the shaft member, when fixing the case means to the shaft member, the case means can be easily fixed by welding to the shaft member and such welding fixation makes it sure that the sensing element can be fixed to the shaft member through the case means.

Also, with use of a mounting structure for mounting a sensing element for measuring a vehicle load according to the first aspect of the invention, because the case means is fixed by welding to the shaft member, when the case means is formed such that it has an outer shape corresponding to the storing recessed portion, even the existence of a slight gap between the storing recessed portion and case means raises no problem and the case means can be easily united with the shaft member by the above-mentioned welding, so that the vehicle load applied to the shaft member can be positively transmitted to the case means side and thus to the side of the sensing element fixed to the interior portion of the case means.

Therefore, when compared with a case in which the case means is press inserted into the storing recessed portion, there is eliminated the need to match even the dimension of the outside diameter of the case means to that of the storing recessed portion, or to finely set the surface roughnesses of the storing recessed portion and case means in order to obtain a necessary friction force between the inner periphery of the storing recessed portion and the outer periphery of the case means. This not only can reduce the working costs of them to a sufficient degree but also eliminates the need to pressure insert the sensing element into the shaft member, which in turn prevents other forces than the load involved with the pressure insertion from being applied to the sensing element, so that an accurate output corresponding to the load can be obtained from the sensing element.

Further, with use of a mounting structure for mounting a sensing element for measuring the load of a vehicle according to the first aspect of the invention, since the sensing element is fixed to the interior portion of the case means, even if the sensing itself is not so formed as to have an outer shape which corresponds to the storing recessed portion, the structure on the sensing element side to be stored into the storing recessed portion, as a whole, has an outer shape which corresponds to the storing recessed portion. Due to this, regardless of the relationship of the posture of the sensing element side structure with respect to the storing recessed portion in the peripheral direction of the shaft member, the corresponding portion of the sensing element side structure can be always positioned in the shaft member portion in which the fixing recessed portion is formed.

Accordingly, even in the case of a sensing element which is not so formed as to have an outer shape corresponding to the storing recessed portion, the sensing element can be fixed by welding to the shaft member without matching the position of the sensing element to that of the shaft member in the peripheral direction of the shaft member, thereby being able to simplify an operation to assemble or mount the sensing element into the shaft member.

Also, with use of a mounting structure for mounting a sensing element for measuring the load of a vehicle according to the second aspect of the invention, the storing recessed portion and the fixing recessed portion are respectively formed in the two end portions of the shaft member, and the portions of the two ends of the shaft member in which the fixing recessed portions are formed are respectively fixed by welding to the case means stored in the respective storing recessed portions formed in the two end portions of the shaft member.

Due to this structure, since two sensing elements are respectively disposed in the two end portions of the shaft member, oven when the load of the vehicle is biasedly applied to either of the two end portions of the shaft member in the axial direction thereof, the accurate load of the vehicle can be obtained based on the outputs of the two sensing elements.

Further, with use of a mounting structure for mounting a sensing element for measuring the load of a vehicle according to the third aspect of the invention, because the fixing recessed portion of the shaft member welded to the case means is filled up with fillers, after the fixing recessed portion of the shaft member is fixed by welding to the case means, if the section of the fixing recessed portion that is different in level from the outer peripheral surfaces of the remaining shaft member portions is filled up with fillers, then there can be removed the level difference of such section with respect to is the outer peripheral surfaces of the remaining shaft member portions.

Still further, with use of a mounting structure for mounting a sensing element for measuring the load of a vehicle according to the fourth aspect of the invention, a plurality of fixing recessed portions of the above-mentioned type are formed at intervals in the peripheral direction of the shaft member in the outer peripheral surfaces of the shaft member portions in which the storing recessed portions of the shaft member are formed, and the shaft member portions in which the plurality of fixing recessed portions are formed are respectively fixed by welding to the case means stored in the storing recessed portions.

In this structure, by forming the plurality of fixing recessed portions in the peripheral direction of the shaft member, the number of the shaft member portions to be fixed by welding to the case means can be increased to thereby be able to enhance the fixing strength of the case means with respect to the shaft member.

What is claimed is:

1. A mounting structure for mounting a sensing element for measuring a load of a vehicle into a shaft member to which the load of the vehicle is applied, comprising:

a storing recessed portion formed in an end portion of said shaft member and extending along an axial direction of said shaft member;

a fixing recessed portion formed in an outer peripheral surface of a portion of said shaft member in which said storing recessed portion of said shaft member is formed; and case having an outer shape corresponding to said storing recessed portion and storable in said storing recessed portion in a state that said sensing element is fixed to an interior portion of said case;

wherein said shaft member portion has a reduced thickness along said fixing recessed portion; and wherein said shaft member portion, with said fixing recessed portion of said shaft member formed therein, is welded to said case stored in said storing recessed portion.

2. A mounting structure for mounting a sensing element for measuring a load of a vehicle as set forth in claim 1, wherein said storing recessed portion and said fixing recessed portion are respectively formed in two end portions of said shaft member, and the two end portions of said shaft member with said fixing recessed portions formed therein are respectively welded to said case means stored in said storing recessed portions respectively formed in the two end portions of said shaft member.

3. A mounting structure for mounting a sensing element for measuring the load of a vehicle as set forth in claim 1, wherein said fixing recessed portion of said shaft member welded to said case is filled with fillers.

4. A mounting structure for mounting a sensing element for measuring a load of a vehicle as set forth in claim 1, wherein a plurality of fixing recessed portions are formed at intervals in a peripheral direction of said shaft member in the outer peripheral surface of the portion of said shaft member in which said storing recessed portion of said shaft member is formed, and portions of said shaft member with said plurality of fixing recessed portions formed therein are respectively welded to a pair of cases means stored in said storing recessed portion.

* * * * *